United States Patent Office 2,947,773
Patented Aug. 2, 1960

2,947,773

HALOGENATED PHOSPHORUS COMPOUNDS

James Forrest Allen, South Charleston, W. Va., assignor to Food Machinery and Chemical Corporation, New York, N.Y., a corporation of Delaware No Drawing. Filed Feb. 1, 1956, Ser. No. 562,642

17 Claims. (Cl. 260—461)

This invention relates to a novel method of preparing halogenated phosphorus compounds, and particularly to a method of preparing novel phosphate esters wherein the halogen atoms are confined to only one of the ester radicals, and wherein at least one halogen atom is on the alpha carbon atom of the halogenated radical.

This invention relates also to novel halogenated phosphorus compounds, and particularly to novel and useful ortho-phosphate esters having at least one halogen atom on the alpha carbon atom of an ester radical. Such alpha-halogenated compounds are found to show enhanced pesticidal activity compared with the beta-halogenated compounds of the prior art.

The products of the present invention may be illustrated by the following generic formula:

$$\begin{array}{c} R \quad O \quad\quad X \\ \phantom{R}\diagdown\!\!\parallel \quad\;\;| \\ \phantom{RRR}P\!-\!O\!-\!C\!-\!Z \\ \phantom{R}\diagup\quad\;\;\;\;| \\ R_1 \quad\quad\quad Y \end{array}$$

wherein X is halogen, Y may be hydrogen, halogen, or any organic radical such as alkyl, substituted alkyl, aralkyl, aryl and substituted aryl, and Z may be any organic radical such as alkyl, substituted alkyl, aralkyl, aryl and substituted aryl. R and $R_1$ may be the same or different and may be chlorine, alkoxy, aryloxy, amino, substituted amino, alkylthio and the like. The variety of novel and useful compounds contemplated in this invention is of broad scope due to the many possible variations among the substituents on the alpha carbon atom.

The main features of the instant invention reside in the provision, for the first time, of a means for preparing orthophosphate esters, as described above, whereby the alpha carbon atom is preferentially halogenated.

In addition, this invention provides a novel method of obtaining in greatly improved yields certain of those types of halogenated phosphate esters for which other means of preparation may theoretically be possible, but which methods are not efficient or economical. These and other features, and attendant advantages, will become apparent from the subsequent description of this invention.

Prior to the present invention, certain halogenated phosphates could be obtained by the addition of halogen to vinyl phosphates. However, the only types of compounds obtainable by this method are alpha,beta-dihalogen addition products or compounds which contain as many or more halogen atoms on the beta carbon than on the alpha carbon of the phosphate ester. In addition, this method exhibits other disadvantages: the vinyl phosphates are expensive to prepare, and the yield of halogen addition product is sometimes very low or non-existent.

Representative types of new and useful compounds which may be prepared by the process of the present invention, and which are not available from processes of the prior art, include the following:

I. Phosphate esters having one halogen atom on the alpha carbon of the ester radical and none on the beta carbon, as exemplified by $$\begin{array}{c} R \quad O \quad\quad Cl \\ \phantom{R}\diagdown\!\!\parallel \quad\;\;| \\ \phantom{RRR}P\!-\!O\!-\!C\!-\!CH_3 \\ \phantom{R}\diagup\quad\;\;\;\;| \\ R_1 \quad\quad\quad H \end{array}$$

II. Phosphate esters having two halogen atoms on the alpha carbon of the ester radical and none on the beta carbon, as exemplified by $$\begin{array}{c} R \quad O \quad\quad Cl \\ \phantom{R}\diagdown\!\!\parallel \quad\;\;| \\ \phantom{RRR}P\!-\!O\!-\!C\!-\!CH_3 \\ \phantom{R}\diagup\quad\;\;\;\;| \\ R_1 \quad\quad\quad Cl \end{array}$$

III. Phosphate esters having a greater number of halogen atoms on the alpha carbon than on the beta carbon, as exemplified by $$\begin{array}{c} R \quad O \quad\;\; Cl \;\; Cl \\ \phantom{R}\diagdown\!\!\parallel \quad\;| \;\;\;| \\ \phantom{RRR}P\!-\!O\!-\!C\!-\!CH_2 \\ \phantom{R}\diagup\quad\;\;\;\;| \\ R_1 \quad\quad\quad Cl \end{array}$$

IV. Phosphate esters having two halogen atoms on both the alpha and the beta carbons, as exemplified by $$\begin{array}{c} R \quad O \quad\;\; Cl \;\; Cl \\ \phantom{R}\diagdown\!\!\parallel \quad\;| \;\;\;| \\ \phantom{RRR}P\!-\!O\!-\!C\!-\!CH \\ \phantom{R}\diagup\quad\;\;\;\;| \;\;\;| \\ R_1 \quad\quad\quad Cl \;\; Cl \end{array}$$

V. Phosphate esters having different halogen atoms in known positions, as exemplified by $$\begin{array}{c} R \quad O \quad\;\; Cl \;\; Br \\ \phantom{R}\diagdown\!\!\parallel \quad\;| \;\;\;| \\ \phantom{RRR}P\!-\!O\!-\!C\!-\!CH_2 \\ \phantom{R}\diagup\quad\;\;\;\;| \\ R_1 \quad\quad\quad H \end{array}$$

and $$\begin{array}{c} R \quad O \quad\;\; Cl \;\; Br \\ \phantom{R}\diagdown\!\!\parallel \quad\;| \;\;\;| \\ \phantom{RRR}P\!-\!O\!-\!C\!-\!CH \\ \phantom{R}\diagup\quad\;\;\;\;| \;\;\;| \\ R_1 \quad\quad\quad Cl \;\; H \end{array}$$

VI. Halogenated vinyl phosphates prepared by dehalogenation of polyhalogenated compounds, as exemplified by $$\begin{array}{c} R \quad O \;\; Cl \;\; Cl \\ \diagdown\!\!\parallel \;\;| \;\;\;| \\ P\!-\!O\!-\!C\!-\!CH_2 \\ \diagup\quad\;\;| \\ R \quad\quad Cl \end{array} \longrightarrow \begin{array}{c} R \quad O \;\;\;\; Cl \\ \diagdown\!\!\parallel \quad | \\ P\!-\!O\!-\!C\!=\!CH_2 \\ \diagup \\ R_1 \end{array}$$

VII. Representative compounds which theoretically may be prepared by addition of halogen to vinyl phosphates, but for which the instant invention provides a new and improved method, include phosphate esters having one halogen atom on each of the alpha and beta carbon atoms, as exemplified by $$\begin{array}{c} R \quad O \quad\;\; Cl \;\; Cl \\ \phantom{R}\diagdown\!\!\parallel \quad\;| \;\;\;| \\ \phantom{RRR}P\!-\!O\!-\!C\!-\!C\!-\!H \\ \phantom{R}\diagup\quad\;\;\;\;| \;\;\;| \\ R_1 \quad\quad\quad H \;\; H \end{array}$$

Each of the above examples is illustrative only, and it is obvious that many additional combinations and modifications are within the scope of this invention. Also, hydrogen atoms in the above formulae may be replaced by a large number of organic radicals and substituted organic radicals.

In these formulae, R and $R_1$ may be the same or different and may be halogen, alkoxy, aryloxy, amino or substituted amino, alkylthio, or any active hydrogen compound which may be reacted with a phosphorodihalidate or monohalidate in the following way:

$$\begin{array}{c} Hal \;\; O \;\;\;\; X \\ \diagdown\!\!\parallel \;\;\;\;\;| \\ P\!-\!O\!-\!C\!-\!Y \\ \diagup\quad\;\;\;\;| \\ Hal \quad\quad\; Z \end{array} \xrightarrow{RH} \begin{array}{c} R \quad O \;\;\;\;\; X \\ \diagdown\!\!\parallel \;\;\;\;| \\ P\!-\!O\!-\!C\!-\!Y \\ \diagup\quad\;\;\;\;| \\ Hal \quad\quad\; Z \end{array} \xrightarrow{R_1H} \begin{array}{c} R \quad O \;\;\;\;\; X \\ \diagdown\!\!\parallel \;\;\;\;| \\ P\!-\!O\!-\!C\!-\!Y \\ \diagup\quad\;\;\;\;| \\ R_1 \quad\quad\; Z \end{array}$$

The phosphorodihalidates and monohalidates which are obtained in the course of the process of this invention are also novel, active compounds.

In the practice of this invention, the first step is the preparation of a phosphorodihalidate by methods well known in the art, such as the reaction of phosphoryl chloride, bromide or fluoride with an alcohol. In the preferred process, reaction with phosphoryl chloride occurs as exemplified below:

POCl₃ + HOCH₂CH₂Cl → Cl₂P(O)OCH₂CH₂Cl + HCl

These reactions are usually carried out by the gradual addition of the alcohol to an equimolar quantity of phosphoryl chloride at temperatures of 0° C. to 50° C., depending upon the reactivity of the alcohol, and at reduced pressure, with vigorous stirring to facilitate the removal of hydrogen chloride. The reaction mixture is then warmed gradually to 50–75° C. to complete the reaction and to remove as much hydrogen chloride as possible. The products obtained from low molecular weight alcohols may be distilled if desired.

The next step, the substitution of halogen for hydrogen, is a free-radical catalyzed reaction. Of the many free-radical producing mechanisms which catalyze this reaction, ultraviolet light is used in the preferred process of the invention. A mercury vapor lamp is a suitable source of ultraviolet light, and the reaction is preferably carried out by the gradual addition of halogen, either gaseous or liquid, to the phosphorodichloridate ester at temperatures in the range of about 20–50° C. for the initial phases of the reaction. At lower temperatures the reaction is usually too slow to be practical and at higher temperatures excessive halogen losses and side reactions may occur. If more than one atom of halogen is to be introduced into the molecule, or if the organic radical in question is particularly resistant to halogenation, it may be desirable to operate at somewhat higher temperatures, usually not exceeding about 80° C. The completion of the reaction may be noted by the disappearance of the characteristic color resulting from the presence of free chlorine or bromine. The products of low to moderate molecular weight can usually be distilled. The halogenated phosphorodichloridates thus obtained are novel and useful compounds in themselves.

The halogen atoms attached to phosphorus are very reactive, and a wide variety of compounds may be obtained by reaction with an organic compound containing an active hydrogen atom. This may be carried out by dissolving the halogenated phosphorodihalidate in an inert solvent such as hexane or ether, cooling to control the reaction rate, and gradually adding a mixture of equivalent quantities of the desired compound containing an active hydrogen atom, such as an aliphatic alcohol or amine, and a tertiary base such as pyridine or diethylaniline to absorb liberated hydrogen halide. Alternatively, the phosphorodihalidate may be added to a solution of the active hydrogen-containing compound and the amine base in an inert solvent. When an amine is one of the reactants, an additional quantity of this amine may be substituted for the tertiary base. When the addition is complete the reaction mixture may be heated to complete the reaction. It is also possible to carry out this process in two steps, obtaining a phosphoromonohalidate which may be reacted further with the same or another active hydrogen-containing compound.

Biological data show that the first hydrogen atoms replaced are those attached to the alpha carbon atom. For example, the compound

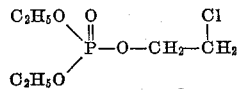

has essentially no insecticidal activity. In comparison, the isomeric compound

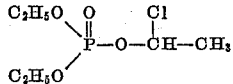

prepared by the process of this invention, has strong insecticidal properties.

The insecticidal activity of representative compounds of the present invention is presented in Table I below. A screening dosage of 0.125% insecticide was prepared by dissolving the compound in acetone and diluting to 0.125% with water. The percent mortality is reported for the two-spotted spider mite (*Tetranychus bimaculatus* Harvey), Mexican bean beetle (*Epilachna varivestis* Muls.), German roach (*Blatella germanica* [L.]) and pea aphid (*Macrosiphum pisi* [Kltb.]).

TABLE 1.—INSECTICIDAL ACTIVITY

| Phosphate | Percent Mortality at 72 Hours | | | |
|---|---|---|---|---|
| | Two-Spotted Mite | Bean Beetle | German Roach | Pea Aphid |
| (C₂H₅O)₂P(O)OCHClCH₃ | 100 | 100 | 100 | 100 |
| (C₂H₅O)₂P(O)OCCl₂CH₃ | 100 | 100 | 100 | 100 |
| (C₂H₅O)₂P(O)OCCl₂CH₂Cl | 100 | 100 | 100 | 100 |
| (C₂H₅O)₂P(O)OCHClCH₂Br | 99 | 0 | 0 | 0 |
| ((CH₃)₂N)₂P(O)OCHClCH₂Cl | 94 | 0 | 10 | 0 |
| ((C₂H₅)₂N)₂P(O)OCHClCH₂Cl | 100 | 0 | 5 | 55 |

The practice of the invention is further illustrated in the following representative examples, wherein parts are by weight unless otherwise indicated:

EXAMPLE 1

*Preparation of 1-chloroethyl phosphorodichloridate*

One hundred six parts of ethyl phosphorodichloridate was placed in a flask fitted with a stirrer, Dry Ice condenser, and a graduated addition funnel connected at the top to a Dry Ice condenser. Chlorine gas was led into the Dry Ice condenser connected to the dropping funnel until approximately 92.3 parts of liquid chlorine was collected. The liquid chlorine was then introduced in small portions into the ethyl phosphorodichloridate under illumination from a mercury vapor lamp. The temperature of the reaction mixture was kept at 15–25° C. by external cooling. Distillation of the product at 1 mm. pressure gave an 18% yield of 1-chloroethyl phosphorodichloridate boiling at 41–45° C. and having $n^{25}_D$ 1.4495. Calc'd. for C₂H₄Cl₃O₂P: Cl, 53.9%; P, 15.7%. Found: Cl, 53.6%; P, 15.6%.

EXAMPLE 2

*Preparation of 1,2-dichloroethyl phosphorodichloridate*

By the method of Example 1, 2-chloroethyl phosphorodichloridate (0.87 mole), prepared from equimolar quantities of ethylene chlorohydrin and phosphoryl chloride, was chlorinated at 50–60° C. with 0.95 mole of chlorine. Distillation of the product at 1.6 mm. pressure gave a 90% yield of 1,2-dichloroethyl phosphorodichloridate boiling at 72–73° C. and having $n^{25}_D$ 1.4799. Calc'd. for C₂H₃Cl₄O₂P: Cl, 61.4%; P, 13.4%. Found: Cl, 60.5%; P, 13.5%.

EXAMPLE 3

*Preparation of 1,1,2-trichloroethyl phosphorodichloridate*

By the method of Example 1, 2-chloroethyl phosphorodichloridate (0.87 mole) was chlorinated at 50–65° C. with 1.9 moles of chlorine. Distillation at 1.7 mm. pressure gave an 83% yield of 1,1,2-trichloroethyl phosphorodichloridate boiling at 76–78° C. and having $n^{25}_D$ 1.4900. Calc'd. for $C_2H_2Cl_5O_2P$: Cl, 66.8%; P, 11.7%. Found: Cl, 65.0%; P, 11.6%.

EXAMPLE 4

*Preparation of 2-bromo-1-chloroethyl phosphorodichloridate*

One half mole of 2-bromoethyl phosphorodichloridate, obtained from equimolar quantities of ethylene bromohydrin and phosphoryl chloride, was chlorinated by the method of Example 1 with 0.55 mole of chlorine at 20–40° C. A 92% yield of crude 2-bromo-1-chloroethyl phosphorodichloridate having $n^{25}_D$ 1.4980 was obtained and this was analyzed without being distilled. Calc'd. for $C_2H_3Cl_3BrO_2P$: halogen, 14.5 milliequivalents per gram; P, 11.2%. Found: halogen, 13.0 milliequivalents per gram; P, 11.8%.

EXAMPLE 5

*Preparation of diethyl 1,2-dichloroethyl phosphate*

Thirty-one and one half parts of absolute ethanol, 54.2 parts pyridine and 130 parts of hexane were placed in a flask equipped with a stirrer, water condenser, and addition funnel. With stirring and external cooling to maintain a temperature of 25–30° C., 79.1 parts of 1,2-dichloroethyl phosphorodichloridate, obtained as in Example 2, was gradually added. When addition was complete stirring was continued for 2.5 hours and the pyridinium chloride then removed by filtration. Removal of the hexane in vacuo and distillation of the product gave 65.1 parts (76% yield) of diethyl 1,2-dichloroethyl phosphate, boiling at 104–107° C. at 1.6 mm. of mercury, and having $n^{25}_D$ 1.4389. Calc'd. for $C_6H_{13}Cl_2O_4P$: Cl, 28.2%; P, 12.4%. Found: Cl, 26.2%; P, 12.9%.

EXAMPLE 6

*Preparation of diethyl 1-chloroethyl phosphate*

1-chloroethyl phosphorodichloridate (0.22 mole) obtained as in Example 1, was reacted with absolute ethanol (0.44 mole) and pyridine (0.44 mole) by the method of Example 5 except that the ethanol and pyridine were added to the phosphorodichloridate. Distillation at 1–4 mm. pressure gave a 47% yield of diethyl 1-chloroethyl phosphate boiling at 75–100° C. The fraction analyzed boiled at 92–100° C. and had $n^{35}_D$ 1.4199 and $d_4^{35}$ 1.1693. Calc'd. for $C_6H_{14}ClO_4P$: Cl, 16.4%; P, 14.3%. Found: Cl, 16.2%; P, 13.7%.

EXAMPLE 7

*Preparation of diethyl hexachlorooctyl phosphate*

Hexachlorooctyl phosphorodichloridate (0.27 mole), obtained by the chlorination of octyl phosphorodichloridate by the method of Example 1, was dissolved in carbon tetrachloride (0.52 mole) and to this solution was added over a period of 40 minutes a mixture of ethanol (0.54 mole) and pyridine (0.54 mole) at 30° C. The reaction mixture was then warmed to 40° C. for a few minutes, filtered to remove the amine salt, and the solvent removed in vacuo. The yield of crude diethyl hexachlorooctyl phosphate, a viscous liquid, was 85%. Calc'd. for $C_{12}H_{21}Cl_6O_4P$: Cl, 45.0%; P, 6.5%. Found: Cl, 46.7%; P, 6.6%.

EXAMPLE 8

*Preparation of ethyl ethylthioethyl 1,2-dichloroethyl phosphate*

Absolute ethanol (0.28 mole) and pyridine (0.28 mole) were added at 0° C. to a solution containing 1.13 mole of hexane and 0.28 mole of 1,2-dichloroethyl phosphorodichloridate, prepared as in Example 1, and the well-stirred mixture was allowed to warm slowly to 25° C. To the resulting product, ethyl 1,2-dichloroethyl phosphorochloridate, was then added 0.28 mole each of pyridine and ethylthioethanol, with cooling to maintain the temperature at 22–30° C. When addition was complete the reaction mixture was heated to 50° C. for 30 minutes and then filtered to remove pyridinium chloride. The hexane and other low-boiling material were removed by heating to 119° C. at 2.5 mm. of mercury pressure, leaving 16 parts or an 18% yield of ethyl ethylthioethyl 1,2-dichloroethyl phosphate. Calc'd. for $C_8H_{17}Cl_2O_4PS$: Cl, 22.8%; P, 10.0%; S, 10.3%. Found: Cl, 21.3%; P, 10.6%; S, 8.9%.

EXAMPLE 9

*Preparation of 1,2-dichloroethyl tetraethylphosphorodiamidate*

One mole of diethylamine was gradually added to 0.25 mole of 1,2-dichloroethyl phosphorodichloridate dissolved in 1.9 mole of hexane at about 5° C. over a period of 45 minutes. The reaction mixture was then heated to 50–60° C. for 40 minutes and allowed to stand overnight. Filtration and removal of solvent in vacuo were followed by distillation of the product at 0.5 mm. of mercury. The yield of 1,2-dichloroethyl tetraethylphosphorodiamidate, boiling at 112–133° C. and having $n^{25}_D$ 1.4651, was 84%. Calc'd. for $C_{10}H_{23}Cl_2N_2O_2P$: Cl, 23.3%; P, 10.2%. Found: Cl, 23.3%; P, 10.9%.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. The alpha-chloro phosphorodichloridate of the formula

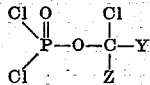

wherein Y is selected from the group consisting of hydrogen, halogen, alkyl radicals of 1 to 8 carbon atoms and haloalkyl radicals of 1 to 7 carbon atoms; and Z is selected from the group consisting of alkyl radicals of 1 to 8 carbon atoms and haloalkyl radicals of 1 to 7 carbon atoms.

2. The alpha-chloro phosphate ester of the formula

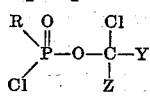

wherein Y is selected from the group consisting of hydrogen, halogen, alkyl radicals of 1 to 8 carbon atoms and haloalkyl radicals of 1 to 7 carbon atoms; Z is selected from the group consisting of alkyl radicals of 1 to 8 carbon atoms and haloalkyl radicals of 1 to 7 carbon atoms; and R is selected from the group consisting of lower alkoxy and di(lower alkyl)amino radicals.

3. The alpha-chloro phosphate ester of the formula

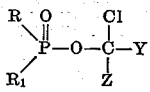

wherein R and $R_1$ are each selected from the group consisting of lower alkoxy and di(lower alkyl)amino radicals; Y is selected from the group consisting of hydrogen, halogen, alkyl radicals of 1 to 8 carbon atoms and haloalkyl radicals of 1 to 7 carbon atoms; and Z is selected from the group consisting of alkyl radicals of 1 to 8 carbon atoms and haloalkyl radicals of 1 to 7 carbon atoms; and wherein said alpha-chloro phosphate ester has at least as many halogen atoms on the alpha carbon as on any carbon atom adjacent to said alpha carbon.

4. The chlorinated phosphate ester of the formula

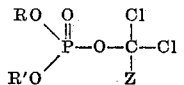

wherein R and R' are lower alkyl radicals and Z is selected from the group consisting of alkyl radicals of 1 to 8 carbon atoms and haloalkyl radicals of 1 to 7 carbon atoms.

5. The chlorinated phosphate ester of the formula

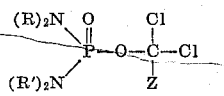

wherein R and R' are lower alkyl radicals and Z is selected from the group consisting of alkyl radicals of 1 to 8 carbon atoms and haloalkyl radicals of 1 to 7 carbon atoms.

6. 1,2-dichloroethyl phosphorodichloridate.
7. 2-bromo-1-chloroethyl phosphorodichloridate.
8. Diethyl 1-chloroethyl phosphate.
9. Diethyl 1,1,2-trichloroethyl phosphate.
10. Diethyl 1,1-dichloroethyl phosphate.
11. A pesticidal composition comprising as the essential active ingredient a halogenated phosphate ester as described in claim 3.
12. The process of preparing an alpha-chloro phosphorodichloridate of the formula

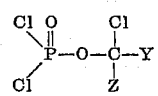

wherein Y is selected from the group consisting of hydrogen, halogen, alkyl radicals of 1 to 8 carbon atoms and haloalkyl radicals of 1 to 7 carbon atoms; and Z is selected from the group consisting of alkyl radicals of 1 to 8 carbon atoms and haloalkyl radicals of 1 to 7 carbon atoms; comprising: reacting chlorine with a phosphorodichloridate of the formula:

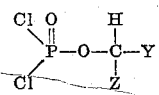

wherein Y and Z are as described, in the presence of a free radical producing agent, thereby producing said alpha-chloro phosphorodichloridate.

13. The process of preparing an alpha-chloro phosphate ester of the formula

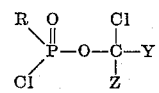

wherein Y is selected from the group consisting of hydrogen, halogen, alkyl radicals of 1 to 8 carbon atoms and haloalkyl radicals of 1 to 7 carbon atoms; Z is selected from the group consisting of alkyl radicals of 1 to 8 carbon atoms and haloalkyl radicals of 1 to 7 carbon atoms; and R is selected from the group consisting of lower alkoxy and di(lower alkyl)amino radicals; comprising: first reacting chlorine with a phosphorodichloridate of the formula

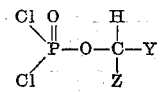

wherein Y and Z are as described, in the presence of a free-radical producing agent; then reacting the alpha-chloro phosphorodichloridate produced with an approximately equimolar amount of a compound selected from the group consisting of lower alkanols and lower alkyl amines; thereby replacing one of the chlorine atoms attached to phosphorus with a radical of the group represented by R, to produce said alpha-chloro phosphate ester.

14. The process of preparing an alpha-chloro phosphate ester of the formula:

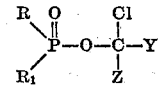

wherein Y is selected from the group consisting of hydrogen, halogen, alkyl radicals of 1 to 8 carbon atoms and haloalkyl radicals of 1 to 7 carbon atoms; Z is selected from the group consisting of alkyl radicals of 1 to 8 carbon atoms and haloalkyl radicals of 1 to 7 carbon atoms; and R and $R_1$ are each selected from the group consisting of lower alkoxy and di(lower alkyl)amino radicals; comprising: first reacting chlorine with a phosphorodichloridate of the formula

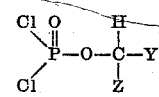

wherein Y and Z are as described, in the presence of a free-radical producing agent; then reacting the alpha-chloro phosphorodichloridate produced with a compound selected from the group consisting of alcohols and amines; thereby replacing at least one of the chlorine atoms attached to phosphorus with a radical of the group represented by R and $R_1$.

15. The process of preparing an alpha-chloro phosphorodichloridate of the formula

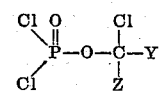

wherein Y is selected from the group consisting of hydrogen, halogen, alkyl radicals of 1 to 8 carbon atoms and haloalkyl radicals of 1 to 7 carbon atoms; and Z is an alkyl radical of 1 to 8 carbon atoms; comprising: reacting chlorine with a phosphorodichloridate of the formula:

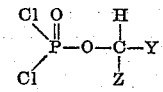

wherein Y and Z are as described, in the presence of ultraviolet light, thereby producing said alpha-chloro phosphorodichloridate.

16. The process of preparing an alpha-chloro phosphorodichloridate of the formula

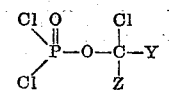

wherein Y is selected from the group consisting of hydrogen, halogen, alkyl radicals of 1 to 8 carbon atoms and haloalkyl radicals of 1 to 7 carbon atoms; and Z is a haloalkyl radical of 1 to 7 carbon atoms; comprising: reacting chlorine with a phosphorodichloridate of the formula

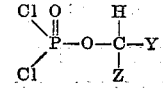

wherein Y and Z are as described, in the presence of ultraviolet light, thereby producing said alpha-chloro phosphorodichloridate.

17. The process of preparing an alpha-chloro phosphorodichloridate of the formula

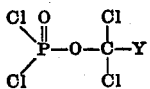

wherein Y is selected from the group consisting of hydrogen, halogen, alkyl radicals of 1 to 8 carbon atoms and haloalkyl radicals of 1 to 7 carbon atoms, comprising: reacting chlorine with a phosphorodichloridate of the formula

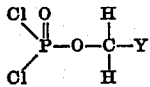

wherein Y is as described, in the presence of ultraviolet light, thereby producing said alpha-chloro phosphorodichloridate.

References Cited in the file of this patent
UNITED STATES PATENTS 2,727,058    Conley _____ Dec. 13, 1955

FOREIGN PATENTS 896,942    Germany _____ Nov. 16, 1953

OTHER REFERENCES

Perkow et al.: "Naturwiss," vol. 39, No. 15, p. 353 (1952).